United States Patent [19]
Higashiyama et al.

[11] Patent Number: 5,938,829
[45] Date of Patent: Aug. 17, 1999

[54] WATER BASED INK AND INK-JET RECORDING METHOD

[75] Inventors: Shunichi Higashiyama, Yokkaichi; Masaya Fujioka, Nagoya; Takeo Kitahara, Nagoya; Hideto Yamazaki, Nagoya; Masahito Kato, Nagoya, all of Japan

[73] Assignee: Brother Kogyo Kabushiki Kaisha, Nagoya, Japan

[21] Appl. No.: 08/821,304

[22] Filed: Mar. 20, 1997

[30] Foreign Application Priority Data

Mar. 26, 1996 [JP] Japan .................................. 8-069795

[51] Int. Cl.⁶ .................................................... C09D 11/00
[52] U.S. Cl. ...................................... 106/31.58; 106/31.86
[58] Field of Search ............................... 106/31.58, 31.86

[56] References Cited

U.S. PATENT DOCUMENTS

| | | | |
|---|---|---|---|
| 5,417,747 | 5/1995 | Arata et al. | 106/31.58 |
| 5,431,720 | 7/1995 | Nagai et al. | 106/31.58 |
| 5,478,383 | 12/1995 | Nagashima et al. | 106/31.58 |
| 5,486,549 | 1/1996 | Itagaki et al. | 106/31.58 |
| 5,667,569 | 9/1997 | Fujioka | 106/31.58 |

FOREIGN PATENT DOCUMENTS

| | | |
|---|---|---|
| A-55-65271 | 5/1980 | Japan . |
| A-62-101672 | 5/1987 | Japan . |

*Primary Examiner*—Deborah Jones
*Assistant Examiner*—Veronica Faison
*Attorney, Agent, or Firm*—Oliff & Berridge, PLC

[57] ABSTRACT

An inventive ink comprises a water-soluble dye or a pigment as a coloring agent, 5 to 15% by weight of polyvalent alcohol monoalkyl ether selected from the group consisting of tetraethylene glycol monoalkyl ethers and pentaethylene glycol monoalkyl ethers, 5 to 50% by weight of polyvalent alcohol, and pure water. When recording is performed in accordance with the ink-jet recording system by using the inventive ink, an excellent result is obtained from any viewpoint concerning, for example, the recording characteristic, the fixation to an objective recording material, the quick drying characteristic, the printing quality characteristic, and the low odor characteristic. The inventive ink is useful as an ink to be used for ink-jet recording apparatuses based on various recording systems, making it possible to obtain an excellent recording result.

20 Claims, No Drawings

WATER BASED INK AND INK-JET RECORDING METHOD

FIELD OF THE INVENTION

The present invention relates to improvement in a water-based ink and an ink-jet recording method.

DESCRIPTION OF THE RELATED ART

The ink-jet recording system has been hitherto known, as based on any one of ink-discharging systems including, for example, an electrostatic attraction system, a system for using a piezoelectric element to give mechanical vibration or displacement to an ink, and a system for generating bubbles by heating an ink to utilize a pressure generated thereby. Ink droplets are formed in accordance with the discharging system as described above. A part or all of the ink droplets are allowed to adhere to an objective recording material such as a sheet of paper so that recording is performed. On the other hand, when a writing instrument such as a fountain pen, a felt pen, and a ball-point pen is used, it is well known that recording is performed by discharging an ink from a capillary tube, and allowing an objective recording material to receive the ink thereon. Those known and used as the ink to be adopted for the ink-jet recording system or the writing instrument as described above include a variety of preparations obtained by dissolving or dispersing a water-soluble dye or a pigment selected from those of the various types, in water or in a liquid medium comprising water and a water-soluble organic solvent.

The conventional ink as described above is required to have various performances. Especially required performances include a recording characteristic or liquid-stabilizing characteristic to enable stable discharge without causing any occurrence of clogging and precipitation in a nozzle, an orifice, or a penpoint of an recording apparatus or a writing instrument when recording is performed by using an ink, when recording is stopped, and when recording is not performed for a long period of time; a quick drying characteristic to quickly dry printed characters and images so that no blur occurs even when the printed characters and images are rubbed by a finger or the like; a printing quality characteristic to avoid beard-like blur (feathering) on printed characters, ruled lines and so on, and avoid mixture or blend of colors (bleeding) at a portion at which mutually different colors adjoin to one another; and a low odor characteristic to allow an ink itself to have little odor.

It has been hitherto tried to produce an ink which satisfies the performances described above.

Japanese Patent Laid-Open No. 55-65271 discloses, for example, an ink containing major components of a polyvalent alcohol derivative selected from (mono, di, tri)-ethylene glycol alkyl ethers and/or (mono, di, tri)-ethylene glycol alkyl ether acetates, alcohol amine, a water-soluble dye, and water. Since the ink contains alcohol amine and the polyvalent alcohol derivative, it simultaneously satisfies the ink clogging-preventive characteristic in the nozzle and the quick drying characteristic after printing.

Japanese Patent Laid-Open No. 62-101672 discloses a pigment ink for writing instruments, containing at least a pigment, a dispersing agent, sorbitan and/or sorbitol, and water. According to this patent document, the ink is excellent in dispersion stability when it is used for a writing instrument. Further, the ink is excellent in clogging-preventive and anti-drying characteristics for a penpoint.

However, the conventional inks including those obtained by the illustrative conventional techniques as described above failed to satisfy all of the liquid-stabilizing characteristic, the quick drying characteristic, the printing quality characteristic, the safety characteristic, and the low odor characteristic.

SUMMARY OF THE INVENTION

The present invention has been made in order to solve the problem involved in the conventional techniques as described above, an object of which is to provide an ink which simultaneously satisfies the liquid-stabilizing characteristic, the quick drying characteristic, the printing quality characteristic, and the low odor characteristic, and provide an ink cartridge including the ink accommodated therein, and an ink-jet recording method based on the use of the ink.

According to a first aspect of the present invention, there is provided a water-based ink comprising:

at least one of a water-soluble dye and a pigment as a coloring agent;

5 to 15% by weight of polyvalent alcohol monoalkyl ether having a vapor pressure of less than 0.01 mmHg at 20 ° C.;

5 to 50% by weight of polyvalent alcohol; and water.

The ink according to the present invention contains 5 to 15% by weight of the polyvalent alcohol monoalkyl ether having a vapor pressure of less than 0.01 mmHg at 20° C., and the ink contains 5 to 50% by weight of the polyvalent alcohol. Therefore, the ink according to the present invention is excellent in any of the recording characteristic, the quick drying characteristic, the printing quality characteristic, and the low odor characteristic. The polyvalent alcohol monoalkyl ether may be one selected from the group consisting of tetraethylene glycol monoalkyl ethers and pentaethylene glycol monoalkyl ethers.

According to a second aspect of the present invention, there is provided an ink cartridge comprising:

a water-based ink comprising at least one of a water-soluble dye and a pigment as a coloring agent, 5 to 15% by weight of polyvalent alcohol monoalkyl ether having a vapor pressure of less than 0.01 mmHg at 20° C., 5 to 50% by weight of polyvalent alcohol, and water;

an ink-impregnating material for being impregnated with the water-based ink to be contained therein; and a main cartridge body for accommodating the ink-impregnating material. The ink cartridge is excellent in storage stability, because it contains the ink according to the present invention. After being installed to a printing head, when the ink is discharged therefrom, the discharged ink is excellent in any of the recording characteristic, the quick drying characteristic, the printing quality characteristic, and the low odor characteristic.

According to a third aspect of the present invention, there is provided an ink-jet recording method comprising the steps of:

allowing an ink-spouting nozzle to approach a recording area on an objective recording material; and spouting, from the ink-spouting nozzle, a water-based ink comprising at least one of a water-soluble dye and a pigment as a coloring agent, 5 to 15% by weight of polyvalent alcohol monoalkyl ether having a vapor pressure of less than 0.01 mmHg at 20° C., 5 to 50% by weight of polyvalent alcohol, and water.

According to the recording method of the present invention, neither clogging nor precipitate occurs in any recording apparatus or writing instrument. Further, the recording method of the present invention makes it possible to obtain a high quality printing result which is excellent in the quick drying characteristic without causing any feathering and bleeding.

DETAILED DESCRIPTION OF PREFERRED EMBODIMENTS

Dyes, which are usable as a constitutive component of the ink to be used in the present invention, include water-soluble dyes represented by, for example, direct dyes, acid dyes, basic dyes, and reactive dyestuffs. Especially, those which are preferable as the ink for the ink-jet recording system and satisfy the required performances such as vividness, water-solubility, stability, and light fastness include, for example, C. I. Direct Black 17, 19, 32, 51, 71, 108, 146, 154, 168; C. I. Direct Blue 6, 22, 25, 71, 86, 90, 106, 199; C. I. Direct Red 1, 4, 17, 28, 83, 227; C. I. Direct Yellow 12, 24, 26, 86, 98, 132, 142; C. I. Direct Orange 34, 39, 44, 46, 60; C. I. Direct Violet 47, 48; C. I. Direct Brown 109; C. I. Direct Green 59; C. I. Acid Black 2, 7, 24, 26, 31, 52, 63, 112, 118; C. I. Acid Blue 9, 22, 40, 59, 93, 102, 104, 113, 117, 120, 167, 229, 234; C. I. Acid Red 1, 6, 32, 37, 51, 52, 80, 85, 87, 92, 94, 115, 181, 256, 289, 315, 317; C. I. Acid Yellow 11, 17, 23, 25, 29, 42, 61, 71; C. I. Acid Orange 7, 19; C. I. Acid Violet 49; C. I. Basic Black 2; C. I. Basic Blue 1, 3, 5, 7, 9, 24, 25, 26, 28, 29; C. I. Basic Red 1, 2, 9, 12, 13, 14, 37; C. I. Basic Violet 7, 14, 27; and C. I. Food Black 1, 2.

The illustrative dyes described above are especially preferable for the ink of the present invention. However, the present invention is not limited to the mentioned dyes, and it is possible to use any dyes.

A pigment may be used as the coloring agent for the ink of the present invention, in place of the dye or together with the dye. It is possible to use, as the pigment, carbon black as well as a variety of inorganic and organic pigments. Those usable as the pigment include, for example, azo-pigments such as azo lakes, insoluble azo-pigments, condensed azo-pigments, and chelate azo-pigments; polycyclic pigments such as phthalocyanine pigments, perylene and perinone pigments, anthraquinone pigments, quinacridone pigments, dioxazine pigments, thioindigo pigments, isoindolinone pigments, and quinophthalone pigments; dye lakes such as basic dye type lakes and acid dye type lakes; organic pigments such as nitro pigments, nitroso pigments, and aniline black daylight fluorescent pigments; and inorganic pigments such as titanium oxides, iron oxide type pigments, and carbon black type pigments. Other pigments may be used provided that they can be dispersed in an aqueous phase. Further, it is also possible to use those obtained by applying a surface treatment to the pigment described above with, for example, a surfactant or a high molecular weight dispersing agent. Namely, for example, it is possible to use graft carbon.

The illustrative pigments described above are especially preferable for the ink of the present invention. However, the present invention is not limited to the mentioned pigments, and it is possible to use any pigments.

When the pigment described above is used as the coloring agent of the present invention, the pigment is subjected to a dispersing treatment in accordance with a hitherto known method, together with an appropriate dispersing agent, a solvent, pure water, and optionally other additives.

Those usable as the dispersing agent include, for example, high molecular weight dispersing agents and surfactants used for a pigment dispersion as described in Japanese Patent Laid-Open No. 62-101672. Those usable as the high molecular weight dispersing agent include, for example, proteins such as gelatin, albumin, and casein; natural rubbers such as gum arabic and tragacanth gum; glucosides such as saponin; cellulose derivatives such as methylcellulose, carboxycellulose, and hydroxymethylcellulose; natural polymers such as lignin sulfonic acid salt and shellac; anionic polymers such as salts of polyacrylic acid, salts of styrene-acrylic acid copolymers, salts of vinylnaphthalene-acrylic acid copolymers, salts of styrene-maleic acid copolymers, salts of vinylnaphthalene-maleic acid copolymers, and sodium salt or phosphate of β-naphthalenesulfonic acid-formalin condensation product; and non-ionic polymers such as polyvinyl alcohol, polyvinyl pyrrolidone, and polyethylene glycol. Those usable as the surfactant include, for example, anionic surfactants such as salts of fatty acids, salts of higher alcohol sulfate esters, salts of liquid fatty oil sulfate esters, and salts of alkylallylsulfonic acids; and non-ionic surfactants such as polyoxyethylene alkyl ethers, polyoxyethylene alkyl esters, sorbitan alkyl esters, and polyoxyethylene sorbitan alkyl esters. It is possible to use one agent or two more agents appropriately selected from the dispersing agents and the surfactants described above. In general, it is desirable that the dispersing agent and/or the surfactant is used in an amount of 1 to 20% by weight with respect to a total amount of the ink.

As for a dispersing machine, any general dispersing machine may be used for dispersing the pigment. However, for example, those usable as the dispersing machine include a ball mill, a roll mill, and a sand mill. Among them, it is especially preferable to use a high speed type sand mill.

Each of the dye and the pigment described above may be used singly. Alternatively, it is also possible to use those obtained by mutually mixing two or more ones of the dyes or the pigments, or mutually mixing the dye or dyes and the pigment or pigments.

The dye and/or the pigment may be generally used at a ratio of 1 to 20% by weight with respect to the ink of the present invention. Desirably, the dye and/or the pigment may be used in a range of 0.3 to 15% by weight.

Those preferably used as the polyvalent alcohol to be used for the ink of the present invention have an effect of preventing the ink from drying (wetting effect) so that the liquid-stabilizing characteristic of the ink may be improved. Those preferably used as the polyvalent alcohol include, for example, polyalkylene glycols such as polyethylene glycol and polypropylene glycol; alkylene glycols such as ethylene glycol, propylene glycol, butylene glycol, diethylene glycol, dipropylene glycol, triethylene glycol, tripropylene glycol, 1,2,6-hexanetriol, thiodiglycol, 1,3-butanediol, 1,5-pentanediol, and hexylene glycol; and glycerol.

The polyvalent alcohol is contained in the ink at a content of 5 to 50% by weight with respect to a total amount of the ink on the basis of the weight. If the content is less than 5% by weight, the wetting function is insufficient, resulting in a problem such as clogging. On the other hand, if the content exceeds 50% by weight, the viscosity of the ink is excessively increased, resulting in a problem such as discharge failure, and extremely slow drying on a sheet of recording paper. The content of the polyvalent alcohol is preferably 7 to 40% by weight, and more preferably 10 to 30% by weight.

The polyvalent alcohol monoalkyl ether used for the ink to be used in the present invention has the following purpose. Namely, the polyvalent alcohol monoalkyl ether is used for the purpose to effectively accelerate the penetrating speed of the ink into the recording paper so that the quick drying characteristic of the ink on the paper is improved, the bleeding resulting from slow drying on the recording paper is avoided, and the feathering involved in penetration is suppressed. Accordingly, it is preferable to use the certain polyvalent alcohol monoalkyl ether with which the purpose described above is achieved more effectively.

In general, polyvalent alcohol alkyl ethers have peculiar odors. If those having a vapor pressure higher than 0.01 mmHg at 20° C. are used for the ink, the ink generates an odor, causing a problem for the ink to be used at offices and homes. However, the polyvalent alcohol monoalkyl ether, which is selected from tetraethylene glycol monoalkyl ethers and pentaethylene glycol monoalkyl ethers exemplified below, has a low vapor pressure of less than 0.01 mmHg at 20° C. The selected polyvalent alcohol monoalkyl ether provides a low odor even when it is used for the ink, without causing the problem described above.

Specifically, the polyvalent alcohol monoalkyl ether, which is selected from tetraethylene glycol monoalkyl ethers and pentaethylene glycol monoalkyl ethers, includes, for example, tetraethylene glycol monomethyl ether (vapor pressure at 20° C.: less than 0.01 mmHg), tetraethylene glycol monobutyl ether (vapor pressure at 20° C.: less than 0.01 mmHg), pentaethylene glycol monomethyl ether (vapor pressure at 20 ° C: less than 0.01 mmHg), and pentaethylene glycol monobutyl ether (vapor pressure at 20° C: less than 0.01 mmHg).

The polyvalent alcohol monoalkyl ether is preferably contained in the ink at a content of 5 to 15% by weight with respect to a total amount of the ink on the basis of the weight. If the content is less than 5% by weight, the penetrating speed of the ink into the recording paper is slow, causing problems concerning drying time and bleeding. On the other hand, if the content exceeds 15% by weight, the penetration of the ink into the recording paper becomes excessive. As a result, the ink arrives at the back of the recording paper, and a problem also arises concerning feathering.

The water contained in the ink of the present invention is preferably selected from water having a high purity, such as ion exchanged-water and distilled water rather than ordinary water like tap water.

The water is contained in the ink at a content which is determined in a broad range depending on the types of the polyvalent alcohol, the polyvalent alcohol monoalkyl ether, compositions thereof, and desired characteristics of the ink. However, the content is generally in a range of 10 to 90% by weight, preferably 10 to 75% by weight, and more preferably 20 to 70% by weight with respect to a total weight of the ink.

The present invention and the ink used in the present invention are basically constructed as described above. Besides, it is possible to add a variety of known agents including, for example, dispersing agents, surfactants, viscosity-adjusting agents, surface tension-adjusting agents, pH-adjusting agents, preservatives, and mildewproofing agents, if necessary.

When it is intended to prepare an ink to be used for an ink-jet recording method of the type in which a recording liquid is charged, the ink may be added with a specific resistance-adjusting agent such as inorganic salts including, for example, lithium chloride, ammonium chloride, and sodium chloride.

When the ink is applied to an ink-jet system of the type in which the ink is discharged by the aid of the action of thermal energy, for example, an additive may be added to adjust values of physicochemical properties concerning the action of heat (for example, specific heat, coefficient of thermal expansion, and thermal conductivity).

The problems of the conventional technique are sufficiently solved by the ink used in the present invention obtained as described above. The ink of the present invention is well-balanced and excellent in any of the recording characteristic (signal response, stability of droplet formation, discharge stability, continuous recording performance for a long period of time, and ink discharge stability after standstill of operation for a long period of time), the liquid-stabilizing characteristic, the storage stability, the fixation to an objective recording material, the quick drying characteristic, the printing quality characteristic, and the low odor characteristic, concerning the ink-jet system. Accordingly, the ink of the present invention is useful as an ink for the ink-jet recording based on a variety of systems. Thus, excellent recording results can be obtained by using the ink of the present invention.

EXAMPLES

Examples of the ink according to the present invention will be explained below. In the following description, % means % by weight on the basis of the weight.

EXAMPLE 1

The following respective materials were mixed with each other at the following mixing ratio (% by weight), and an obtained mixture was sufficiently agitated, followed by filtration with a membrane filter of 0.8 μm to prepare an ink.

| Liquid composition | |
|---|---|
| Acid Yellow 23 | 1% |
| (Acid Yellow XX-SF, produced by Hoechst): | |
| Polyethylene glycol | 9% |
| (average molecular weight: 200): | |
| Tetraethylene glycol monobutyl ether: | 6% |
| Pure water: | 84% |

The prepared ink was used to investigate T1: storage stability, T2: discharge stability, T3: discharge response, T4: quality of recorded image, T5: fixation and quick drying on various objective recording materials, and T6: printing quality characteristics on various objective recording materials by using two types of recording apparatuses. The first recording apparatus had a multiple head of the on-demand type for generating droplets by giving thermal energy to the ink in the recording head to perform recording (discharge orifice diameter: 35 μm, resistance value of heating resistor: 150 ohms, operating voltage: 30 volts, frequency: 2 KHz). The second recording apparatus had a multiple head of the on-demand type for generating droplets by giving a pressure to the ink in the recording head by means of vibration generated by a piezoelectric element to perform recording (discharge orifice diameter: 40 μm, operating voltage: 30 volts, frequency: 10 KHz). As described below, excellent results were obtained in any of the characteristics T1~T6. Further, the prepared ink was investigated for T7: low odor. As described below, a good results was also obtained in this characteristic T7.

T1 (storage stability): The ink was sealed in a bag made of a plastic film, and it was stored at −30° C. and 60° C. for 6 months. Even after the storage, deposition of any insoluble matter was not observed, and there was no change in physicochemical properties and color of the liquid.

T2 (discharge stability): The ink was continuously discharged for 24 hours in atmospheres at room temperature, 5°

C., and 40° C. High quality recording was always successful in a stable manner under any of the conditions described above.

T3 (discharge response): The ink was investigated for intermittent discharge at every 2 seconds and for discharge after being left to stand for 2 months. In any case, no clogging was found at the orifice tip, and recording was performed stably and uniformly.

T4 (quality of recorded image): Images were recorded on objective recording materials described below. Any of the images recorded on any of the objective recording materials were vivid, and had a high concentration. Objective recording materials:

High quality paper "Xerox 4024" produced by Xerox;

High quality paper "Seven Star" produced by Hokuetsu Paper Mills;

Middle quality paper "Shirobotan" produced by Honshu Paper;

Non-size paper "Toyo Filter Paper No. 4" produced by Toyo Filter Paper.

T5 (fixation and quick drying on various objective recording materials): The ink was subjected to printing onto the objective recording materials described in the foregoing item T4. After 5 seconds, printed images were rubbed by a finger to judge the presence or absence of image distortion and blur. As a result, neither image distortion nor blur occurred on any of the objective recording materials. Thus, the ink exhibited excellent fixation.

T6 (printing quality characteristics on various objective recording materials): Printing quality characteristics were confirmed for characters and images recorded on the objective recording materials described in the foregoing item T4. The ink provided good results both for feathering and bleeding.

T7 (low odor): 100 g of the ink was weighed and dispensed into a beaker made of glass having a volume of 100 ml, and its odor was confirmed. As a result, the ink was substantially odorless.

EXAMPLE 2

An ink was prepared by using the following liquid composition in accordance with the same method as described in Example 1. The characteristics of T1 to T7 were investigated for the prepared ink in the same manner as described in Example 1. Excellent results were obtained for any of the characteristics T1~T7 in the same manner as described in Example 1.

| Liquid composition | |
| --- | --- |
| Acid Blue 9 | 2% |
| (Acid Blue AE-SF, produced by Hoechst): | |
| Diethylene glycol: | 6% |
| Tetraethylene glycol monobutyl ether: | 12% |
| Pure water: | 80% |

EXAMPLES 3 and 4

Inks were prepared by using the following liquid compositions in accordance with the same method as described in Example 1. The respective characteristics of T1 to T7 were investigated for the respective prepared inks in the same manner as described in Example 1. Excellent results were obtained for any of the characteristics T1 to T6 in the same manner as described in Example 1. As for the low odor characteristic T7, the odor was recognized to such a degree that it was almost insensible.

| Liquid composition of Example 3 | |
| --- | --- |
| Acid Red 52 | 1% |
| (Acid Rhodamine B-SF, produced by Hoechst): | |
| Tripropylene glycol: | 42% |
| Pentaethylene glycol monobutyl ether: | 5% |
| Pure water: | 52% |

| Liquid composition of Example 4 | |
| --- | --- |
| Direct Black 168 | 3% |
| (Direct Black HEF-SF, produced by Hoechst): | |
| Glycerol: | 22% |
| Pentaethylene glycol monobutyl ether: | 7% |
| Pure water: | 68% |

EXAMPLE 5

Carbon black as a pigment and pure water in a 100-fold amount were agitated together for 1 hour and filtrated. The filtration was repeated three times, followed by drying. An obtained preparation was used to prepare a liquid composition containing the following components. The liquid composition was subjected to a dispersing treatment by using Pearl Mill (trade name, produced by Ashizawa) to obtain a dispersion liquid.

Zirconia was used as a grinding medium which was charged into the mill. Ceramic-processed parts were used for liquid-contacting portions of the dispersing machine.

| Liquid composition | |
| --- | --- |
| Carbon Black | 10% |
| (MA-7, produced by Mitsubishi Chemical): | |
| Styrene-maleic anhydride copolymer | 7% |
| (molecular weight: 10,000, acid value: 175): | |
| Glycerol: | 20% |
| Tetraethylene glycol monobutyl ether: | 5% |
| Pure water: | 58% |

Next, the obtained dispersion liquid was applied to a centrifuge to remove coarse particles, and then the dispersion liquid was filtrated under a pressure with a membrane filter having an average pore size of 1 $\mu$m to prepare an ink. The ink was investigated for the characteristics T1 to T7 in the same manner as described in Example 1. Excellent results were obtained in the same manner as described in Example 1.

COMPARATIVE EXAMPLE 1

An ink was prepared by using a liquid composition described below, in accordance with the same preparation method as used in Example 1. The prepared ink was investigated for the characteristics T1 to T7 in the same manner as described in Example 1. Good results were obtained for the characteristics T1 to T6. However, as for the low odor characteristic T7, an intolerable irritant odor was confirmed.

| Liquid composition | |
| --- | --- |
| Acid Yellow 23 | 1% |
| (Acid Yellow XX-SF, produced by Hoechst): | |
| Polyethylene glycol | 10% |
| (average molecular weight: 200): | |
| Diethylene glycol monomethyl ether: | 6% |
| (vapor pressure at 20° C.: 0.1 mmHg) | |
| Pure water: | 83% |

COMPARATIVE EXAMPLE 2

An ink was prepared by using a liquid composition described below, in accordance with the same preparation method as used in Example 1. The prepared ink was investigated for the characteristics T1 to T7 in the same manner as described in Example 1. Good results were obtained for the characteristics T1 to T4 and T7. However, as for the characteristic T5, the penetration of the ink was slow, and consequently printed images were blurred when they were rubbed by a finger. As for the characteristic T6, a good result was obtained for feathering, however, serious bleeding was observed.

| Liquid composition | |
| --- | --- |
| Acid Blue 9 | 2% |
| (Acid Blue AE-SF, produced by Hoechst): | |
| Diethylene glycol: | 30% |
| Tetraethylene glycol monobutyl ether: | 2% |
| Pure water: | 66% |

COMPARATIVE EXAMPLE 3

An ink was prepared by using a liquid composition described below, in accordance with the same preparation method as used in Example 1. The prepared ink was investigated for the characteristics T1 to T7 in the same manner as described in Example 1. Good results were obtained for the characteristics T4 to T7. However, as for the characteristic T1, the liquid changed in terms of physicochemical properties and color tone. As for the characteristic T2, the ink was not discharged stably in any of atmospheres at room temperature, 5° C., and 40° C., and recorded characters and images had defective qualities. As for the characteristic T3, the ink frequently caused clogging at the orifice tip, and discharged droplets were frequently deviated or curved, when the ink was intermittently discharged at every 2 seconds, as well as when the ink was discharged after being left to stand for 2 months.

| Liquid composition | |
| --- | --- |
| Acid Yellow 23 | 1% |
| (Acid Yellow XX-SF, produced by Hoechst): | |
| Polyethylene glycol | 3% |
| (average molecular weight: 200): | |
| Tetraethylene glycol monomethyl ether: | 6% |
| Pure water: | 90% |

COMPARATIVE EXAMPLE 4

An ink was prepared by using a liquid composition described below, in accordance with the same preparation method as used in Example 1. The prepared ink was investigated for the characteristics T1 to T7 in the same manner as described in Example 1. Good results were obtained for the characteristics T1 to T5 and T7. As for the characteristic T6, a good result was obtained for bleeding, however, serious feathering was observed. When the back of the printed paper was confirmed, the ink penetrated up to the back.

| Liquid composition | |
| --- | --- |
| Acid Yellow 23 | 1% |
| (Acid Yellow XX-SF, produced by Hoechst): | |
| Polyethylene glycol | 5% |
| (average molecular weight: 200): | |
| Tetraethylene glycol monobutyl ether: | 20% |
| Pure water: | 74% |

COMPARATIVE EXAMPLE 5

An ink was prepared by using a liquid composition described below, in accordance with the same preparation method as used in Example 1. Attempts were made to perform recording with the prepared ink by using the two types of the recording apparatuses described in Example 1. However, the ink was not discharged, and it was impossible to perform printing by those recording apparatuses.

| Liquid composition | |
| --- | --- |
| Acid Yellow 23 | 1% |
| (Acid Yellow XX-SF, produced by Hoechst): | |
| Glycerol: | 70% |
| Pentaethylene glycol monobutyl ether: | 6% |
| Pure water: | 23% |

According to Examples and Comparative Examples described above, the following fact has been clarified. Namely, in order to obtain good results for the characteristics T1 to T7, it is effective that the water-based ink comprises a water-soluble dye or a pigment as a coloring agent, 5 to 15% by weight of polyvalent alcohol monoalkyl ether selected from tetraethylene glycol monoalkyl ethers and pentaethylene glycol monoalkyl ethers, and 5 to 50% by weight of polyvalent alcohol.

The ink according to the present invention has been explained with reference to the illustrative embodiments in which the ink according to the present invention is used as the ink for ink-jet recording. However, the ink according to the present invention is not limited thereto. For example, the ink according to the present invention can be used for a writing instrument such as a fountain pen. Further, the ink according to the present invention can be also used in another form. Namely, a detachable ink cartridge to be used for an ink-jet printer or the like may be impregnated with the ink according to the present invention. The detachable ink cartridge usually comprises a water-based ink, an ink-impregnating material for being impregnated with the water-based ink, and a cartridge body for accommodating the ink-impregnating material. The detailed structure and material of the detachable ink cartridge are described in, for example, U.S. Pat. No. 5,509,140, the content of which is incorporated herein by reference.

As clarified from the foregoing description, the ink according to the present invention satisfies all of the liquid-stabilizing characteristic, the quick drying characteristic, the printing quality characteristic, the safety characteristic, and the low odor characteristic. The ink cartridge based on the use of the ink according to the present invention are well-balanced and excellent in any of the recording characteristic (signal response, stability of droplet formation, discharge stability, continuous recording performance for a long period of time, and ink discharge stability after standstill of operation for a long period of time), the fixation to an objective recording material, the quick drying characteristic, the printing quality characteristic, and the low odor characteristic. The ink-jet recording method according to the present invention is useful as a recording method for ink-jet recording based on various systems, making it possible to provide excellent recording results.

The present invention may be practiced or embodied in other various forms without departing from the spirit or essential characteristics thereof. It will be understood that the scope of the present invention is indicated by the appended claims, and all variations and modifications concerning, for example, the type of the water-soluble dye, the type of the pigment, and the type of other additives, which come within the equivalent range of the claims, are embraced in the scope of the present invention.

What is claimed is:

1. A water-based ink comprising:
   at least one of a water-soluble dye and a pigment as a coloring agent;
   5 to 15% by weight of polyvalent alcohol monoalkyl ether having a vapor pressure of less than 0.01 mm Hg at 20° C., selected from the group consisting of tetraethylene gylcol monoalkyl ethers and pentaethylene glycol monoalkyl ethers;
   5 to 50% by weight of polyvalent alcohol; and
   water.

2. The water-based ink according to claim 1, wherein the polyvalent alcohol monoalkyl ether is one selected from the group consisting of tetraethylene glycol monomethyl ether, tetraethylene glycol monobutyl ether, pentaethylene glycol monomethyl ether, and pentaethylene glycol monobutyl ether.

3. The water-based ink according to claim 2, wherein the polyvalent alcohol monoalkyl ether is one of tetraethylene glycol monobutyl ether and pentaethylene glycol monobutyl ether.

4. The water-based ink according to claim 3, wherein at least one of the water-soluble dye and the pigment as the coloring agent has a content of 0.3 to 15% by weight.

5. The water-based ink according to claim 3, wherein the water is one selected from the group consisting of ion-exchanged water, pure water, and distilled water, and the water has a content of 20 to 70% by weight with respect to a total weight of the ink.

6. The water-based ink according to claim 3, wherein the polyvalent alcohol has a content of 5 to 50% by weight with respect to a total weight of the ink.

7. The water-based ink according to claim 6, wherein the polyvalent alcohol is one selected from the group consisting of alkylene glycols, polyalkylene glycols, and glycerol.

8. The water-based ink according to claim 1, wherein the water-soluble dye is one selected from the group consisting of direct dyes, acid dyes, basic dyes, and reactive dyestuffs.

9. The water-based ink according to claim 1, wherein the pigment is one of organic pigments and inorganic pigments.

10. The water-based ink according to claim 9, wherein the pigment is carbon black.

11. The water-based ink according to claim 1, wherein the water-based ink comprises the pigment as the coloring agent and further comprises one of a high molecular weight dispersing agent and a surfactant.

12. The water-based ink according to claim 1, further comprising at least one selected from the group consisting of dispersing agents, surfactants, viscosity-adjusting agents, surface tension-adjusting agents, pH-adjusting agents, preservatives, and mildewproofing agents.

13. An ink cartridge comprising:
   a water-based ink comprising at least one of a water-soluble dye and a pigment as a coloring agent, 5 to 15% by weight of polyvalent alcohol monoalkyl ether having a vapor pressure of less than 0.01 mm Hg at 20° C. and selected from the group consisting of tetraethylene glycol monoalkyl ethers and pentaethylene glycol monoalkyl ethers, 5 to 50% by weight of polyvalent alcohol, and water;
   an ink-impregnating material for being impregnated with the water-based ink to be contained therein; and
   a main cartridge body for accommodating the ink-impregnating material.

14. An ink-jet recording method comprising the steps of:
   allowing an ink-spouting nozzle to approach a recording area on an objective recording material; and
   spouting, from the ink-spouting nozzle, a water-based ink comprising at least one of a water-soluble dye and a pigment as a coloring agent, 5 to 15% by weight of polyvalent alcohol monoalkyl ether having a vapor pressure of less than 0.01 mm Hg at 20° C. and selected from the group consisting of tetraethylene glycol monoalkyl ethers and pentaethylene glycol monoalkyl ethers, 5 to 50% by weight of polyvalent alcohol, and water.

15. The ink cartridge of claim 13, wherein said polyvalent alcohol monoalkyl ether is selected from the group consisting of tetraethylene glycol monomethyl ether, tetraethylene glycol monobutyl ether, pentaethylene glycol monomethyl ether, and pentaethylene glycol monobutyl ether.

16. The ink cartridge of claim 15, wherein said polyvalent alcohol monoalkyl ether is selected from the group consisting of tetraethylene glycol monobutyl ether and pentaethylene glycol monobutyl ether.

17. The ink-jet recording method of claim 14, wherein said polyvalent alcohol monoalkyl ether is selected from the group consisting of tetraethylene glycol monomethyl ether, tetraethylene glycol monobutyl ether, pentaethylene glycol monomethyl ether, and pentaethylene glycol monobutyl ether.

18. The ink-jet recording method of claim 17, wherein said polyvalent alcohol monoalkyl ether is selected from the group consisting of tetraethylene glycol monobutyl ether and pentaethylene glycol monobutyl ether.

19. The water-based ink of claim 1, wherein said polyvalent alcohol monoalkyl ether is selected from the group consisting of pentaethylene glycol monoalkyl ethers.

20. The water-based ink of claim 19, wherein said polyvalent alcohol monoalkyl ether is selected from the group consisting of pentaethylene glycol monomethyl ether, and pentaethylene glycol monobutyl ether.

* * * * *